Patented Sept. 27, 1927.

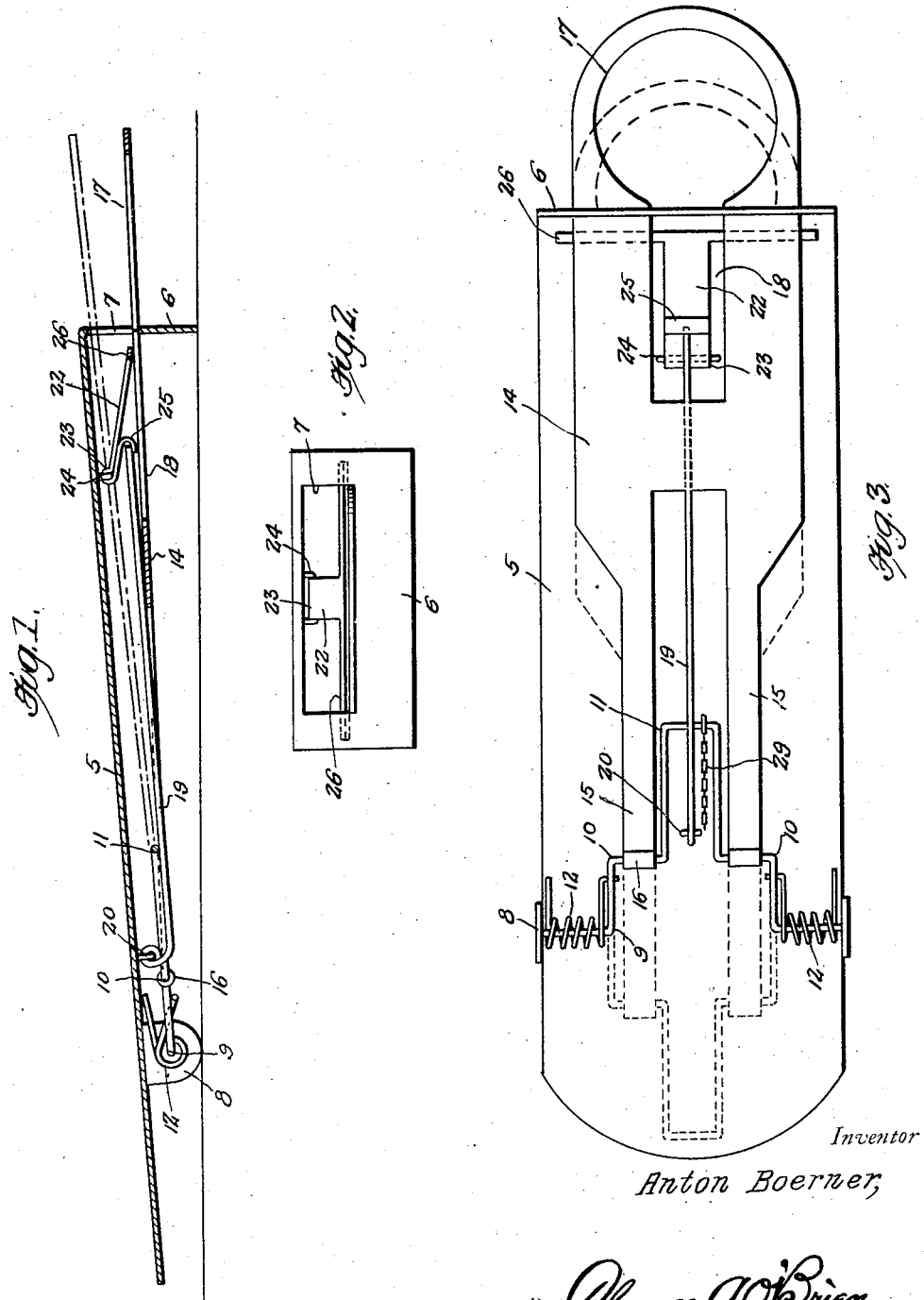

1,643,602

UNITED STATES PATENT OFFICE.

ANTON BOERNER, OF THOMPSON, NEBRASKA.

SNARE TRAP.

Application filed April 28, 1927. Serial No. 187,222.

The present invention relates to a snare trap and has for its principal object to provide an exceedingly simple structure of this nature which is thoroughly efficient and reliable in use and operation, inexpensive to manufacture, compact and convenient, easy to set, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a longitudinal section through the trap embodying the features of my invention, Figure 2 is an end elevation thereof, and Figure 3 is a bottom plan view thereof.

Referring to the drawing in detail, it will be seen that the numeral 5 denotes an oblong plate having one end thereof bent downwardly as at 6 and this portion 6 has a slot or opening 7 formed therein. Adjacent the other end of the plate 5 on the sides thereof are depending ears 8 in which is journaled a crank shaft 9 having two crank portions 10 and a further crank portion 11 therebetween. Springs 12 are wound about the ends of the crank shaft 12 and have one end engaged with the plate and the other end engaged with the arms of the cranks 10 for normally holding the cranks 10 and 11 in the dotted line position shown in Figure 3, that is, pointing away from the end 6.

A plate 14 has a pair of spaced parallel extensions 15 at one end terminating in sleeves 16 circumjacent cranks 10. The other end of the plate is provided with a circular opening 17 from which extends a slot 18 longitudinally of the plate 14. A trigger 19 has one end engaged with an eye 20 on the bottom of the plate 5 so that the trigger may be extended over the crank 11 to hold the same in the full line position shown in Figure 3. A trip 22 is bent over upon itself at one end to form a sleeve 23 circumjacent a loop 24 on the plate 5 and to terminate in a hook 25 while the other end terminates in a cross piece 26.

When the trap is set the plate 14 rests on the bottom of the slot 7 and the end of the trigger 19 is engaged in the hook 25 so that the spring urges the crosspiece 26 in abutment with the plate 14. The opening 17 is placed over the opening out of which the animal will come and as the animal attempts to pass through the opening 17 he will lift the plate 14 to the dotted line position shown in Figure 1 thereby rocking the trip 22, disengage the hooked end 25 from the end of the trigger 19 and allow the crank shaft 9 to rock so as to be forced to the dotted line position shown in Figure 3 at which time the cranks 10 will pull the extensions 15 and the plate 14 to hold the animal in the opening 17 against the end 6 as will be quite apparent. It is preferable to provide a chain 29 engaged with the plate 5 and with the crank 11 to limit the movement thereof.

It is thought that the construction, operation and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. A trap of the class described comprising an elongated plate having one end bent angularly and provided with a slot, a crank shaft journaled across the other end of the plate and having a pair of cranks of one length and a third crank therebetween of a longer length, springs associated with the crank shaft to urge the cranks thereof in one direction pointing away from the first mentioned end of the plate, a second plate extending through the slot and having an opening at one end merging into an inwardly directed slot and at the other end provided with a pair of spaced parallel extensions merging into sleeves circumjacent the short cranks, a trigger engaged with the first plate to extend over the long crank to hold the cranks of the crank shaft pointing toward the first end of the first plate, and trip means associated with said trigger.

2. A trap of the class described comprising an elongated plate having one end bent angularly and provided with a slot, a crank shaft journaled across the other end of the plate and having a pair of cranks of one length, and a third crank therebetween of a longer length, springs associated with the crank shaft to urge the cranks thereof in one direction pointing away from the first mentioned end of the plate, a second plate extending through the slot and having an opening at one end merging into an inwardly directed slot and at the other end provided with a pair of spaced parallel extensions merging into sleeves circumjacent the short cranks, a trigger engaged with the first plate to extend over the long crank to hold the cranks of the crank shaft pointing toward the first end of the first plate, and trip means associated with said trigger, said trip means comprising a member bent over upon itself to provide a sleeve and to terminate in a hook at one end, the other end terminating in a cross piece, means pivotally mounted the sleeve of the trigger to the body so that the hook end may engage the extremity of the trigger and the cross piece engages the second plate to hold it against the bottom of the slot in the first end of the first plate all in the manner and for the purpose specified.

In testimony whereof I affix my signature.

ANTON BOERNER.